3,658,763
COATING COMPOSITION HAVING REACTIVE SURFACE ISOCYANATE GROUPS

Henry C. Dehm, Salt Lake City, Utah, assignor to Hercules Incorporated, Wilmington, Del.
No Drawing. Filed Nov. 17, 1969, Ser. No. 877,473
Int. Cl. C08g 22/28
U.S. Cl. 260—77.5 CH          8 Claims

ABSTRACT OF THE DISCLOSURE

A crosslinked polymeric coating composition having a high concentration of reactive surface isocyanate groups is provided. This crosslinked polymeric composition is a chemical intermediate particularly suitable for use in providing solids with a coating which can be bonded to resinous binders.

---

This invention relates to a new class of crosslinked polymeric compositions which are chemical intermediates having a very high concentration of reactive surface isocyanate groups. In another aspect this invention relates to a process for depositing a crosslinked polymeric composition having a high concentration of reactive surface isocyanate groups on a solid substrate for the purpose of surface tailoring of the coated solid by subsequent reaction(s) for any purpose intended.

The reaction between an isocyanate and water is well known. It has now been discovered, however, that organic isocyanates having a functionality of 3 or more when reacted with a controlled amount of water wherein the ratio of NCO groups of the organic isocyanate to water molecules is at least 3/1, produce an extremely reactive and highly useful crosslinked polymeric composition having a high concentration of reactive surface NCO groups. By maintaining the resulting crosslinked polymeric composition in an inert atmosphere the reactive surface is preserved. This crosslinked polymeric composition is suitable for coating solid surfaces including solids having a very low surface free energy such as Teflon, to metals such as aluminum which have the highest surfaces free energies of all solids. Solids coated with the crosslinked polymeric composition of this invention can be reacted with all types of organic compounds reactive with isocyanates to surface tailor the surface of the solid for innumerable uses.

The polymeric composition of this invention is prepared by a process comprising admixing an organic isocyanate having an NCO functionality of at least 3 dissolved in an aprotic solvent and a controlled amount of water for a time sufficient to provide a crosslinked polymeric composition, having a high concentration of reactive surface NCO groups, which is insoluble in an aprotic solvent fully defined hereinafter. Reaction between the organic isocyanate and water is carried out with the organic isocyanate dissolved in an aprotic solvent at ambient temperature (22° C.) or above. The ratio of the NCO groups of the organic isocyanate to water molecules needed to produce the crosslinked polymeric composition of this invention must be at least 3/1. The minimum amount of water which can be employed to produce the crosslinked polymeric composition of this invention having reactive surface NCO groups is the amount of water required to cause sufficient reaction between the organic isocyanate and water whereby an insoluble crosslinked polymeric composition forms within the aprotic solvent employed. This minimum amount of water will vary only slightly with various aprotic solvents. It has been found in coating solids that when the ratio of NCO groups of the organic isocyanate to water molecules is at least 3/1 that the resultant crosslinked polymeric composition has one surface reactive NCO group for every 20–50 A.$^2$ of original surface area of the solid on which the composition is deposited. The concentration of reactive surface NCO groups is independent of coating thickness within the range generally employed.

The crosslinked polymeric composition of this invention is employed as an intermediate coating composition for solids. Solids to be coated are contacted with an admixture of organic isocyanate dissolved in an aprotic solvent and water until the reacting components produce a crosslinked polymer which is adsorbed over the entire surface of the solid. The coated solids can be separated from the solution by any suitable means such as centrifugation or decantation. The coated solids are maintained in an inert atmosphere to preserve surface reactivity for subsequent reaction.

While not bound by reaction theory, it is believed that the polymeric composition of this invention is produced principally as follows. An NCO group on one of the organic isocyanate molecules bearing 3 or more NCO groups reacts with a molecule of water to form a carbamic acid group; the latter quickly loses a molecule of $CO_2$ to form a primary aromatic amine group. The amine group adds quickly to an NCO group of an adjacent organic isocyanate molecule bearing 3 or more NCO groups to give a urea linkage and a new molecule. The process is repeated until the growing molecule is sufficiently large to adsorb on the surface of a solid to be coated. The adsorbed molecule can further crosslink through interaction with water to form the final coating having a high concentration of reactive surface NCO groups. The crosslinks responsible for the deposition of the polymeric coating composition are predominantly urea linkages.

In order to produce the highest possible concentrations of surface reactive isocyanate groups on the polymeric composition of this invention the organic isocyanate employed should have the highest possible number of isocyanate functional groups (NCO groups) per molecule. The average isocyanate to isocyanate functional group distance should also be as short as possible. To achieve the minimum distance between isocyanate groups in the polymeric composition it is necessary to employ water as the crosslinking agent to react with the isocyanates to produce the shortest possible crosslink between the NCO groups of the organic isocyanates employed. A wide variety of other crosslinking agents including polyols and polyamines having a functionality of 2 or more, will react with an organic isocyanate having a functionality of 3 or more to produce an insoluble, crosslinked coating bearing reactive surface isocyanate groups. However, in all cases the distance between NCO groups in the polymeric composition is considerably greater and the final composition has a lower concentration of reactive surface isocyanate groups than when the crosslinker is water.

Organic isocyanates which can be employed to prepare the crosslinked polymeric composition of this invention must have an NCO functionality of at least 3. Mixtures of organic isocyanates having an NCO functionality of 3 or more can be employed. Organic isocyanates having an NCO functionality of 2 will not react to form the crosslinked polymeric composition of this invention. The functionality of isocyanates having an initial functionality of 3 or more can be increased by dimerization, trimerization, carbodiimide bond formation or by interaction with a limited amount of water to form urea linkages. These interactions can be carried out at ambient temperature (22° C.) or above with or without a catalyst as outlined in Saunders and Frisch, "Polyurethanes, Part, I, Chemistry," Interscience, New York (1962), Chapter III. These interactions account for the fact that the viscosity of isocyanates as received is usually higher than that reported commercially. Products insolubilized by excessive crosslinking by these interactions cannot be employed to produce the coating composition of this invention. However, it is often possible to separate useful soluble high isocyanates, from mixtures containing insolubilized material by filtration, centrifugation, etc. When doing so it is usually advantageous to dilute the soluble material with an appropriate aprotic solvent before the separation is attempted.

The functionality of isocyanates having an initial functionality of at least 3 can also be increased by reaction with primary alcohols and amines having a functionality of 2 or more. While the soluble higher isocyanates obtained in this manner can be utilized to obtain crosslinked, insoluble coatings bearing reactive surface isocyanate groups, the average surface NCO—NCO distance in the crosslinked, insoluble coatings is appreciably greater than it would be if the functionality of the same isocyanate starting materials were increased via dimerization, trimerization, carbodiimide formation or urea linkage formation as outlined in Saunders and Frisch, "Polyurethanes, Part I, Chemistry," Interscience, New York (1962), Chapter III.

Organic isocyanates having a functionality of 2 can be removed from admixture with isocyanates having a functionality of 3 or more by any suitable means, including vacuum distillation chromatography and countercurrent distribution. A convenient method to isolate the higher isocyanates substantially free of diisocyanates is the selective precipitation of the higher isocyanates from solution by addition of an appropriate non-solvent or mixture of non-solvents for the high molecular weight isocyanates. For example, addition of aliphatic hydrocarbons to a solution of a mixture of isocyanates having a functionality of 2 and higher, dissolved in a solvent such as benzene or methylene chloride, causes the higher isocyanates to be precipitated free of diisocyanates. A suitable organic isocyanate for use in this invention is a high molecular weight fraction of polymethylene polyphenyl isocyanates separated from the diisocyanate molecules in the mixture of polymethylene polyphenyl isocyanates available commercially under the trade name "PAPI" from the Upjohn Company. PAPI is sold as a mixture of polymethylene polyphenyl isocyanates having an average NCO functionality of about 3, a viscosity of 2.5 poises at 77° F. and containing about 50% by weight of methylene bis(phenyl isocyanate). The remainder of the polymethylene polyphenyl isocyanates have a functionality of 3 or more.

The high molecular weight fraction of PAPI is defined herein to mean that fraction of PAPI in which all of the organic isocyanates whether as originally present in PAPI or as a higher molecular weight fraction thereof as a result of dimerization, trimerization, or reaction with water, have an NCO functionality of 3 and higher.

Other organic isocyanates having an NCO functionality of at least 3 are commercially available in mixtures. Particularly suitable and commercially available mixtures of organic isocyanates are sold under the trade name "Isonate 7418" and "Isonate 500" manufactured by the Upjohn Company. Isonate 7418 is a mixture of organic isocyanates having a viscosity of 15 poises at 25° C. and an average NCO functionality of 3.2. Isonate 500 is a mixture of organic isocyanates with an average equivalent weight of about 140 and a viscosity of 10 poises at 25° C.

Solids which can be coated with the crosslinked polymeric composition of this invention can have any desired size or shape. Solids can be coated with the crosslinked polymeric composition of this invention by a process comprising as a first step, dissolving an organic isocyanate having a functionality of at least 3 in an aprotic solvent which is substantially a non-solvent for the solid to be coated. Water is then admixed with the organic isocyanate solution in an amount such that the ratio of NCO groups of the isocyanate to molecules of water is at least 3/1. The solid to be coated is contacted with this reaction mixture such as by immersion until the crosslinked polymeric composition having reactive surface NCO groups forms and is adsorbed on the surface of the solid. The solid is then recovered from the mixture by any suitable means such as simple decantation of the solution from the solids. The coated solids are then maintained in an inert atmosphere until ready for use in a subsequent reaction.

Illustrative aprotic solvents which can be employed in preparing the crosslinked polymeric composition of this invention include the lower alkyl esters of acetic acid such as methyl acetate, ethyl acetate, propyl acetate, butyl acetate; chlorinated hydrocarbons such as chloroform, and methylene chloride; ethers such as dioxane and tetrahydrofuran and aromatic hydrocarbons such as benzene, toluene, xylene, and mixtures thereof. The organic isocyanate must be dissolved in an aprotic solvent in order to prepare the crosslinked polymeric composition of this invention. The solution of organic isocyanate in aprotic solvent contains from about 0.1% to about 5% by weight of organic isocyanate based on the weight of the solution. The aprotic solvent chosen for dissolving the organic isocyanate when preparing the composition of this invention for coating of solids, must be substantially a non-solvent for the solid to be coated.

The rate at which isocyanates react with water to form the crosslinked polymeric composition of this invention having reactive surface isocyanate groups depends on the isocyanate molecular weight, functionality and average isocyanate-to-isocyanate functional group distance. Ideally, the starting isocyanate should have the highest possible functionality, the smallest possible average isocyanate-to-isocyanate functional group distance and be very close to the gel point. Not only do such starting materials give rapid coating rates of generally less than one hour with low concentrations of water crosslinker, but also the surface of the coated solid will have the highest possible concentration of reactive surface isocyanate groups.

Catalysts while not essential to formation of the crosslinked polymeric coating composition of this invention are desirable to promote reasonable reaction rates. Illustrative catalysts that can be employed include soluble metal derivatives including tin salts such as stannous octoate and dibutyltin diacetate; zinc salts such as zinc octoate; iron salts such as ferric acetyl acetonate; and tertiary amine catalysts such as triethylamine; triethylenediamine; tetramethylbutanediamine; N - methylmorpholine; N,N'-diethylpiperazine; N,N'-dimethylhexahydroaniline; tribenzylamine, and N,N'-dimethylbenzylamine, and the like.

The following examples will more fully illustrate this invention. All parts and percentages are by weight unless otherwise specified.

Example 1 illustrates a method for increasing the functionality of isocyanate molecules by reaction with water and the separation of a high molecular weight isocyanate from the admixture.

EXAMPLE 1

A reaction vessel equipped with a thermometer, relief valve and sealing means is charged with 2000 parts of PAPI having an average NCO functionality above 3, a gram equivalent weight of 133.7, a viscosity of 6.5 poises and containing 31.4% NCO groups, and 2.8 parts of distilled water. The reaction vessel is placed on an air driven roller to agitate the ingredients. Agitation is continued for five hours at 50° C. The resulting product which is a mixture of higher molecular weight isocyanates, isocyanate dimers, and polymeric urea compounds has a gram equivalent weight of 135.8, a viscosity of 10.3 poise (measured by Roto Visco at 1515 sec.$^{-1}$ at 25° C.) and contains 30.9% NCO groups.

About 1500 parts of this viscous product is dissolved in 1977 parts of benzene. To this solution is slowly added 5850 parts of cyclohexane. The mixture is agitated during this addition. The resulting mixture is allowed to stand for 5 minutes. Supernatant liquid is decanted and a dark brown tarry precipitate is recovered. The precipitate is the higher molecular weight fraction of PAPI and is substantially free of diisocyanates. This separation procedure is repeated substituting white gasoline for cyclohexane. Again, a dark brown precipitate of high molecular weight PAPI is recovered substantially free of diisocyanate.

EXAMPLE 2

About 44 parts of dry high molecular weight PAPI as prepared in Example 1 is dissolved in 10,000 parts methylene chloride containing one part water. The ratio of equivalents of NCO groups to moles of water is 9.2/1.0. To this solution is added 60 parts of triethylamine catalyst. About 454 parts of $200\mu$ ammonium perchlorate particles are added to the reaction vessel. The resulting mixture is agitated by placing the reaction vessel on air driven rollers and rotating the vessel at about 60 r.p.m. at 20° C. A crosslinked polymeric composition is formed which is deposited on the surface of the ammonium perchlorate particles. Samples of coated ammonium perchlorate particles are removed from the reaction vessel at various time intervals after commencement of the deposition process as set forth in Table I and are analyzed for weight percent coating. The coated samples and all processing steps are conducted so as to prevent contact of the coated samples from atmospheric moisture.

EXAMPLE 3

Example 2 is repeated substituting Isonate 7418 for the high molecular weight fraction of PAPI. A crosslinked polymeric composition having reactive surface NCO groups is deposited on the $200\mu$ ammonium perchlorate particles. Samples of coated ammonium perchlorate are taken at various time intervals and analyzed for percent coating and concentration of reactive surface NCO groups. The data for Examples 2 and 3 are given in Table I.

EXAMPLE 5

About 72 parts of dry high molecular weight PAPI as separated in Example 1 is dissolved in a mixture made up of about 450 parts of ethyl acetate, 8350 parts of benzene and one part of water. The ratio of equivalents of NCO groups of the organic isocyanate to moles of water employed is 8/1. To this solution is added one part of dibutyltin diacetate and 200 parts of $200\mu$ ammonium perchlorate. The mixture is agitated as described in Example 2 for 18 hrs. A crosslinked, insoluble polymeric coating bearing one reactive isocyanate group for each 33 $A.^2$ of original surface and amounting to 1.4 percent of the weight of the ammonium perchlorate is deposited uniformly on the surface of the ammonium perchlorate particles. One part of coated product is agitated vigorously with 10 parts of water which is a solvent for ammonium perchlorate, at 20° C. for 30 minutes. The product is filtered and dried and 0.74 part of coated product is recovered indicating that the coating is quite uniform, tough and water resistant.

Examples 6 though 21 which follow illustrate various solid particles which can be coated with the polymeric composition of this invention. These solid particles coated cover a broad spectrum of solids having varying surface free energies. The organic isocyanates employed are prepared from PAPI following the procedures of Example 1. The coating process for Examples 8, 11, 13, 14, 17, 18, 20 and 21 is the same process described in Example 2. The coating process for Examples 6, 7, 9, 10, 12, 15, 16 and 19 is the same process described in Example 5. The crosslinked polymeric coating composition of this invention adheres to the surface of each solid tested. Following coating the solids are maintained in an inert atmosphere. The solids coated are set forth in Table II, and are arranged in order of increasing solid surface free energy. Data on deposition of the crosslinked polymeric composition of this invention for each solid material employed in Examples 6–21 is set forth in Table II.

TABLE II

| Example | Solid | Particle size ($\mu$) | Solvent | Catalyst | Coating, weight percent |
|---|---|---|---|---|---|
| 6 | Teflon | 400 | Benzene ethyl acetate | Dibutyltin diacetate | |
| 7 | Polyethylene | 400 | do | do | |
| 8 | Red phosphorus | | Methylene chloride | Triethylamine | |
| 9 | Cyclotetramethylenetetranitramine | 200 | Benzene ethyl acetate | Dibutyltin diacetate | 2.20 |
| 10 | Molybdenum trioxide | 10 | do | do | |
| 11 | Glass | 200 | Methylene chloride | Triethylamine | |
| 12 | Sand | 500 | Benzene ethyl acetate | Dibutyltin diacetate | |
| 13 | Firebrick | 200 | Methylene chloride | Triethylamine | |
| 14 | Potassium perchlorate | 100 | do | do | 1.4 |
| 15 | Sodium chloride | (1) | Benzene ethyl acetate | Dibutyltin diacetate | |
| 16 | Ammonium perchlorate | 200 | do | do | 1.40 |
| 17 | do | 200 | Methylene chloride | Triethylamine | 0.35 |
| 18 | do | 12 | do | do | 0.40 |
| 19 | Aluminum | 30 | Benzene ethyl acetate | Dibutyltin diacetate | |
| 20 | do | 30 | Methylene chloride | Triethylamine | 0.5 |
| 21 | Zirconium | | do | do | |

1 Salt plate.

TABLE I

| | Crosslinked polymer coating (weight percent) | |
|---|---|---|
| Reaction time (minutes) | Example 2 | Example 3 |
| 5 | 0.11 | 0.22 |
| 15 | 1 0.16 | 2 0.23 |
| 30 | 0.17 | 0.23 |
| 60 | 0.18 | 0.23 |
| 120 | 3 0.19 | 0.23 |
| 180 | 0.22 | 0.23 |

1 One reactive NCO group/49 $A.^2$ of original solid surface area.
2 One reactive NCO group/26 $A.^2$ of original solid surface area.
3 One reactive NCO group/48 $A.^2$ of original solid surface area.

EXAMPLE 4

Example 3 is repeated substituting Isonate 500 for Isonate 7418. Substantially identical coating of the ammonium perchlorate particles with a crosslinked polymeric composition as set forth in Table I for Example 3 is obtained.

In Examples 6–21 the concentration of reactive surface NCO groups on each of the solids coated is determined by reacting the solid surfaces with an excess of aniline and determining the aniline consumed using ultraviolet spectroscopy. This procedure is confirmed by a method which comprises reacting the surface NCO group of the crosslinked polymeric composition with hydroxyethylferrocene, exhaustively extracting unbound hydroxyethylferrocene and analyzing for bound iron by the atomic absorption method as described in Robinson, J. W., "Atom Absorption Spectroscopy," Marcel Dekker Inc., publisher, New York (1966) pp. 129–130. The reactive NCO groups on each of the coated solids as determined by these methods ranges from one NCO group per 20 $A.^2$ of solid surface to about one NCO group per 50 $A.^2$ of solid surface.

The crosslinked polymeric compositions of this invention having reactive surface NCO groups are particularly suitable for tailoring the surface of particles used as fillers in polymeric systems so that chemical bonds form between the filler surface and the binder polymer. Because fillers thus bonded have a greatly reduced tendency to fail at the binder-filler interface or "dewet" as this failure is often referred to, they impart improved mechanical properties to the filled polymer system.

The following example illustrates the use of the crosslinked polymeric coating composition of this invention to eliminate failure of a glass filled vulcanized natural rubber at the rubber-filler interface.

EXAMPLE 22

About 100 parts of 200μ glass spheres coated with the crosslinked polymeric composition of this invention and prepared following the procedure of Example 11 are contacted with a solution comprising 20 parts dry allyl amine and 200 parts of dry benzene in a sealed vessel at 30° C. for 24 hours with occasional swirling. The glass spheres are separated from the benzene solution, washed with benzene and dried.

A resin kettle equipped with agitator, thermometer, condenser and distillate receiver is charged with a solution of 100 parts of unvulcanized, unfilled natural rubber gum stock containing crosslinking agent dissolved in 200 parts of dry benzene. About 40 parts of the coated, allyl amine-treated glass spheres are added to the mixture and the benzene is removed at 35° C. and 2 mm. pressure. The resulting product is cured in a 0.25 inch thick slab at 300° F. and 45 p.s.i. pressure for 100 minutes. Tensile specimens die-cut from the vulcanized slab are failed on the Instron testing machine at 77° F. and a strain rate of 0.74 in./in./min. Microscopic examination of the failure zone shows failure occurring exclusively within the binder phase.

The example is repeated using uncoated 200μ glass spheres. Failure occurs at a lower stress level and predominantly at the glass-rubber interface.

The following example illustrates the use of the crosslinked polymeric composition of this invention to eliminate failure of a glass filled polyurethane elastomer at the polyurethane-filler interface.

EXAMPLE 23

About 40 parts of glass spheres coated as in Example 11, 40 parts of a triol crosslinker, 29 parts of polymeric diol, 6 parts of hexamethylene-diisocyanate, 25 parts of plasticizer, and 0.25 part of curing catalyst are mixed in a Baker-Perkins mixer at 50° C. for one hour. The homogeneous slurry is cast into a dog-bone mold and cured at 50° C. for 5 days. Tensile specimens 0.25 inch thick are sliced from the dogbone slab and are failed on the Instron testing machine at 77° F. and at a strain rate of 0.74 in./in./min. Microscopic examination of the failure zone shows failure occuring exclusively within the binder phase.

The example is repeated using uncoated 200μ glass spheres. Failure of this filled polymer occurs at a lower stress level and predominantly at the glass polyurethane binder interface.

The following example illustrates the conversion of the surface NCO groups of the crosslinked polymeric composition of this invention to amine groups and the effect of coated filler particles thus tailored on the failure mode of an elastomer derived from epoxide-crosslinked polybutadiene dicarboxylic acid.

EXAMPLE 24

A quantity of 200μ glass spheres coated as in Example 11 is placed in a layer about ⅛ inch deep on metal trays and exposed to an atmosphere of 70 percent relative humidity at 80° F. for 18 hours. Analyses showed that essentially all of the original surface isocyanate groups are converted to primary amine groups.

About 40 parts of coated glass spheres bearing surface amine groups, 64.4 parts polybutadiene dicarboxylic acid, 0.5 part liquid triepoxide, 3.25 parts liquid diepoxide, 30 parts plasticizer and one part curing catalyst are mixed in a Baker-Perkins mixer at 60° C. for one hour and the homogeneous slurry is cast into a dogbone mold and cured at 80° C. for 7 days. Tensile specimens 0.25 in. thick are sliced from the dogbone slab and are failed on the Instron testing machine at 77° F. and at a strain rate of 0.74 in./in./min. Microscopic examination of the the failure zone shows failure occuring exclusively within the binder phase.

The example is repeated using uncoated 200μ glass spheres. Failure of this filled polymer occurs at a lower stress level and predominantly at the glass-binder interface.

The following example illustrates the conversion of the surface NCO groups of a solid coated with crosslinked polymeric composition of this invention to urethane linkages bearing pendant methacrylate groups and the effect of coated filler particles thus tailored on the failure mode of poly(n-amyl methacrylate).

EXAMPLE 25

About 200 parts of 200μ glass spheres coated as in Example 11 are contacted with a solution of 40 parts dry 2-hydroxyethyl-methacrylate, 8 parts dibutyltin diacetate and 400 parts of dry dioxane at 25° C. in a sealed vessel for 24 hours with occasional swirling. The coated glass spheres bearing pendant methacrylate groups are separated from the mixture, washed with benzene and dried.

About 2000 parts of n-amyl methacrylate is mixed with 60 parts of high molecular weight poly(n-amyl methacrylate) thickener, 1 part of $\alpha,\alpha'$-azodiisobutyronitrile and 0.14 part methacrylic acid. About 800 parts of coated 200μ glass spheres bearing surface methacrylate groups are stirred into the admixture. The resulting mixture is poured into a polyethylene tray to a depth of 0.25 inch and cured at 40° C. for 48 hours. Tensile specimens 0.25 inch thick are prepared and are failed on an Instron testing machine at 77° F. and at a strain rate of 0.74 in./in./min. Microscopic examination of the failure zone shows failure to have occurred exclusively within the poly(n-amyl methacrylate) binder phase.

This example is repeated using uncoated 200μ glass spheres. Failure of this filled polymer occurs at a lower stress level and predominantly at the glass-binder interface.

Using synthetic methods, the surface NCO groups of the crosslinked polymeric composition of this invention can be chain extended to give a wide variety of pendant molecules. For example, reaction with aniline gives a terminal phenyl group bound to the coating by a urea linkage. Reaction with hydroxyethyl ferrocene gives a terminal ferrocene group bound to the coating by a urethane linkage. Reaction with 3-hydroxy propionic acid and glycidyl gives terminal carboxyl and epoxide groups, respectively. The reaction with allyl amine, allyl alcohol, undecylenyl alcohol, and the like, gives pendant hydrocarbon chains having terminal double bonds. Reaction with polyethylene imine and polyethylene oxide gives pendant polyethylene imine chains and pendant polyethylene oxide chains, respectively. Thus, it is apparent that one skilled in the synthetic art and familiar with isocyanate chemistry can tailor the surface of the crosslinked polymeric composition of this invention in innumerable ways to provide a wide variety of pendant molecules, including polymers, having a wide variety of terminal functional groups.

In tailoring the crosslinked polymeric composition of this invention it is sometimes advantageous to convert the surface NCO groups to amine groups by reaction with water and to subsequently tailor the surface amine groups using classical synthetic methods. For example, reaction of the surface amine groups with octadecyl isocyanate gives terminal hydrocarbon chains linked to the composition by urea linkages. Reaction with cyanuric chloride results in the splitting out of hydrogen chloride and the creation of a new, highly reactive surface by virtue of the pendant reactive chlorine atoms. The surface amine groups can be diazotized and the resulting diazo groups used for further surface tailoring. Also, the surface amine groups can be quaternized. Thus, it is apparent that one skilled in the synthetic art and familiar with amine chemistry can tailor the coating surface in innumerable ways.

There are a number of ways to control the concentration of surface groups. For example, reaction of the surface isocyanate groups with triamino aromatic compounds results in a surface with up to twice as many reactive surface amine groups as original isocyanate groups. The concentration of surface isocyanate groups can be increased by reacting the surface amine groups with an isocyanate having a functionality greater than 2. Also, the concentration of reactive surface isocyanate groups can be systematically reduced by titration with methanol to give unreactive methyl urethane groups; the remaining isocyanate groups can be further tailored using synthetic techniques.

What I claim and desire to protect by Letters Patent is:

1. A crosslinked polymeric composition of matter which is a chemical intermediate having a high concentration of reactive surface NCO groups said composition prepared by a process comprising reacting an organic polyisocyanate free of diisocyanate and having an NCO functionality of at least 3 dissolved in an aprotic solvent with water, the ratio of NCO groups of the organic polyisocyanate to water molecules being at least 3/1, and continuing said reaction until a crosslinked polymeric composition insoluble in the aprotic solvent is produced.

2. The composition of claim 1 in which the reaction takes place in the presence of a catalyst.

3. The composition of claim 2 in which the solution of organic isocyanate dissolved in aprotic solvent contains from about 0.1% to about 5% by weight of organic isocyanate based on the weight of the solution.

4. The composition of claim 3 in which the organic isocyanate comprises a mixture of polymethylene polyphenyl isocyanates.

5. The composition of claim 4 in which the catalyst is triethylamine.

6. The composition of claim 4 in which catalyst is dibutyltin diacetate.

7. The composition of claim 5 in which the aprotic solvent is comprised of methylene chloride.

8. The composition of claim 6 in which the aprotic solvent is comprised of a mixture of benzene and ethyl acetate.

References Cited
UNITED STATES PATENTS

| | | | |
|---|---|---|---|
| 3,226,354 | 12/1965 | Heiss | 260—33.6 |
| 3,294,713 | 12/1966 | Hudson et al. | 260—453 |
| 3,526,652 | 9/1970 | Powers | 260—453 |

OTHER REFERENCES

"Polyurethanes, Chemistry and Technology," Part I, Saunders and Frisch, Interscience Publishers, New York, 1962, p. 77 and pp. 183-185 (TP, 98.P6, S3).

DONALD E. CZAJA, Primary Examiner

E. C. RZUCIDLO, Assistant Examiner

U.S. Cl. X.R.

260—31.2 N, 33.6 UB, 33.8 UR, 77.5 AT